Feb. 3, 1970  F. J. SISK  3,493,488

ELECTRODIALYSIS APPARATUS

Filed June 20, 1967

INVENTOR
Francis J. Sisk
BY Frederick Shapoe
ATTORNEY

United States Patent Office 3,493,488
Patented Feb. 3, 1970

3,493,488
ELECTRODIALYSIS APPARATUS
Francis J. Sisk, Pittsburgh, Pa., assignor to Westinghouse Electric Corporation, Pittsburgh, Pa., a corporation of Pennsylvania
Filed June 20, 1967, Ser. No. 647,449
Int. Cl. B01d 13/02; C02b 1/82
U.S. Cl. 204—301          5 Claims

ABSTRACT OF THE DISCLOSURE

An electrodialysis cell for demineralizing water solutions in which anion and cation membranes and reticulate perm-selective structures are disposed in positions that guide water flow in directions conducive to maximum efficiency of solution and pure water flow and collection of ions from the solution.

BACKGROUND OF THE INVENTION

Field of the invention

This invention relates to a stack of alternating layers of water permeable, ion selective, resin foams, of open cell structure and of alternating, water impermeable, perm-selective membranes into which foam the feed water to be demineralized flows, encounters an electric field for removal of its ionic solutes, and exits quiescently from the resin foam.

Description of the prior art

Electrodialysis is widely employed for desalting of brackish waters and to some extent in chemical synthesis. It employs a series of closely spaced membranes that are alternatively cation selective and anion selective. The membranes bound the channels through which the waters are pumped. By means of electrodes in the end compartments, an electric field is maintained normal to the membranes. Cations flow in the direction of and anions flow counter to the electric field. The electric field flows from the anion membrane to the cation membrane, thus the ions are driven in the proper direction to leave the compartment through the membranes whereby the water in the compartment loses its minerals. Conversely, in alternate compartments the electric field flows from the cation membranes to the anion membranes so that the ions entering through the membranes from the demineralized water are trapped, whereby the solution in the latter compartments gains salt.

In the desalting or dialyzate compartments divergent flow of net ionic charge is essentially not possible since the resulting space charges would require huge potentials. Note however that ion movement is still free within this condition. The premise that, at all points, the density of cations and anions must be nearly precisely the same is usually called the electroneutrality condition. At the bounding membranes the presence of fixed charges in the ion-selective resins permit counter ions, that is, those of opposite sign to the fixed charges, to leave the compartment solution but only in equal fluxes at opposite sides of the compartment. To be perm-selective the membranes must be of higher normality than the solutions in contact with them and thus the transfer number for counter ions in the membrane is higher than in the solution. The flux of counter ions in the solutions restricted by electro-neutrality to concentration driven diffusion must be sufficient to supply the high counter ion flux impressed by the field in the resin. Thus the membrane boundary layer (in the solution) is depleted of counter ions and by reason of the electroneutrality condition, of co-ions as well and the resulting concentration gradient drives the required diffusion of ions. Thus a layer of desalted water is created at the membrane-solution interface. This desalted layer is mixed (in the present practice) with the core stream in the compartment by hard pumping and use of turbulence promoters. Continuous mixing of desalted water into the main stream eventually dilutes the main stream to the desired product concentration. The enthalpy of repeated dilution is lost as heat to the solution and consumes power additional to the enthalpy of separation.

In practice much mechanical energy is spent on turbulence producing pumping to scour the low conductivity boundary layer to as small a thickness as economics of pumping power versus cell votage loss dictates. The resulting optimum energy cost is of the order of 20 times or more the energy cost in a reversible cell. Improvement in this situation is required if electrodialysis is to become a source of cheaply desalted water.

In accordance with the invention it has been found that the most direct possible solution retains the membrane stack and attacks the flow and electrical faults which create the problem. Each membrane is made with a water permeable resin phase on at least one of its faces, preferably of open cell foam structure, and electrically continuous with the membrane. The stack is laid up with the dialyzate chambers completely filled with the foam phases except for optional feed distributor channels along the foam layer interface and dialyzate collector channels along the membrane surfaces. The dialyzate chamber is so polarized by the electric field that the electric field vector points from anion foam to cation foam. The concentrating channels alternate with dialyzate channels and may be fitted with non-polar foam, insulating separators or polar foam in two layers. Feed is introduced into the distributors and flows from them into the foam phases. As it enters the foam, counter ions are attracted by the field into the resin phase and the resulting space charge in the liquid progressively excludes co-ions. The concentration of the solute then falls steadily as the solution progresses into the two foams, and counter ions migrate into the resin phase while co-ions are held back by the field. The product ducts next to the membranes are so arranged as to drain the desalted water flowing through the foam in the neighborhood of the membranes into the product collecting system with minimum mixing with saltier water. The concentrating chambers require no particular baffling and are simply circulated at such a rate as will keep the concentration suitably controlled.

Accordingly, it is a general object of this invention to provide an electrodialysis apparatus in which the thermodynamically lossy intermixture of demineralized or desalted water at the membrane boundary layers with main stream brackish or feed water is avoided due to the elimination of stream turbulence.

It is antoher object of this invention to provide an electroddialysis apparatus in which ion current flows in the low resistance resin and brackish water and by-passes the high resistance, diffusion-limited polarized layer, thereby maintaining high voltage efficiency.

It is a corollary object of this invention to provide an electrodialysis apparatus whereby the work of desalting or demineralizing is performed only once on each increment of product rather than repeatedly as in conventional boundary layer mixing cells.

Finally, it is an object of this invention to satisfy the foregoing problems and desiderata in a simple and expedient manner.

SUMMARY OF THE INVENTION

Briefly, the device of the present invention includes a cathode, an anode, means forming at least one treating chamber and purge chambers on opposite sides of the treating chamber, the chambers being disposed between the anode and cathode, a water impermeable, cation selective membrane between the treating chamber and one purge chamber on the cathode side of the treating chamber, a water impermeable anion selective membrane between the treating chamber and the other purge chamber on the anode side of the treating chamber, each purge chamber having inlet and outlet means for purge water passing through the purge chamber, each treating chamber having feed water inlet means near its central plane and water outlet means near the membrane planes, the treating chamber being at least partially filled with an open-celled cation selective foam on the side adjacent to the cation membrane and with an open-celled anion selective foam on the side adjacent to the anion membrane, the open-celled cation foam overlying a portion of the water outlet means and the open-celled anion foam overlying the remaining portion of the water outlet means, whereby feed water entering the treating chamber flows in a turbulent-free manner through the foam layers between the inlet and outlet means without remixing with subsequent incoming feed water.

BRIEF DESCRIPTION OF THE DRAWINGS

For a better understanding of the nature and objects of this invention, reference is made to the drawings, in which:

In FIG. 1 an electrodialysis apparatus is generally indicated at 10. It includes a cathode 12 and an anode 14 as well as a plurality of frames 16, 18, 20, 22, and 24. The frames are separated from each other by membranes 26, 28, 30 and 32. It is understood that although five frames 16–24 are illustrated, a greater or lesser number may be used without departing from the teachings of this invention. Moreover, inasmuch as FIG. 1 is diagrammatic it is further understood that the electrodes 12 and 14 having wire leads 34 and 36, respectively, may include all or only a portion of the end walls adjacent the respective frames 16 and 24. The frames 16, 20 and 24 provide purge chambers 38, 40 and 42, and the frames 18 and 22 enclose treating chambers 44 and 46. Thus, a treating chamber is disposed between each pair of purge chambers.

Figure 1:
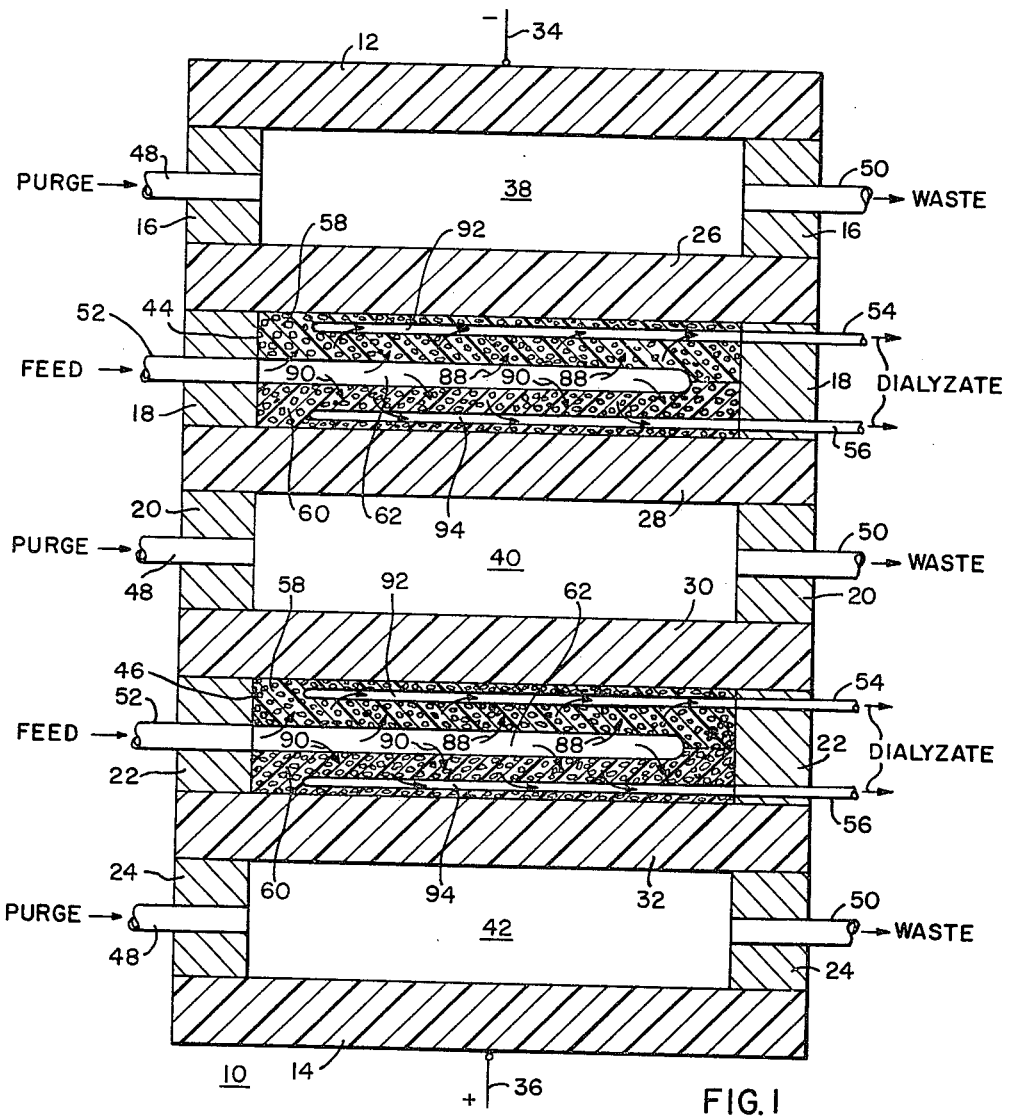
FIGURE 1 is a diagrammatic sectional view of an apparatus embodying the present invention.

Each purge chamber 38, 40 and 42 is provided with inlet means or ports 48 and with outlet means or ports 50. The inlet means or ports 48 and the outlet means or ports 50 extend through the frames 16, 20, and 24 to permit ingress and egress of purge water. Likewise, each treating chamber 44 and 46 is provided with inlet means or ports 52 extending through the frames 18 and 22 to introduce feed water into said chambers. Outlet means for the feed water include similar pairs of ports 54 and 56 which are longitudinally spaced of the respective chambers 44 and 46 in the direction of flow of electric current between the cathode 12 and the anode 14.

As shown in FIG. 1 a substantially half portion of each chamber 44 and 46 is filled with a water pervious, open-celled reticulated foraminous foam 58. Likewise, a substantially second half portion of each chamber 44 and 46 is filled with a water pervious open-celled reticulated foraminous foam 60. Water distribution channels 62 are disposed between and over a substantial portion of the inner face of each pair of foams 58 and 60 in each chamber 44 and 46.

The membranes 26 and 30, being disposed on the side of the chambers 44 and 46 nearest the cathode 12, are composed of cation perm-selective material such as sulfonated polystyrene polymeric material and are impervious to water. The membranes 28 and 32, being disposed on the sides of the treating chambers 44 and 46 nearest the anode 14, are composed of anion perm-selective material such as alkaline or aminated resins and are impervious to water.

Figure 2:
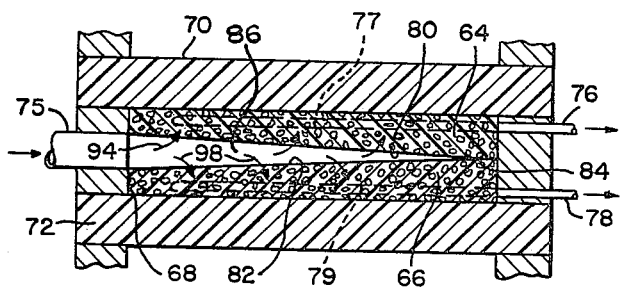
FIG. 2 is a sectional view of another embodiment of a cell.

An alternate formation of the open-celled foam members 58 and 60 is shown in FIG. 2 in which blocks of foam 64 and 66 are disposed in a treating chamber 68 which is disposed between a pair of membranes 70 and 72 and within a frame 74 which membranes and frame have constructions identical with those of the membranes 26 and 28 and frame 18. Similarly, a feed water inlet 75 as well as water outlets 76 and 78 are provided. As shown in FIG. 2, the foam blocks 64 and 66 have converging spaced surfaces 80 and 82 respectively which form an apex 84 at or near the frame 74. The converging surfaces 80 and 82 thereby form a chamber having a triangular cross section 86 the base of which communicates with the inner end of the water inlet 75, to the end that flow in the foam phases is made more nearly normal to the plane of the membranes.

In operation, brackish or salty water is introduced into the chambers 44 and 46 through the inlet ports 52; simultaneously water of a similar character is flowed through the chambers 38, 40 and 42 via the water inlets 48 and outlets 50. The electric circuit is closed between the cathode 12 and anode 14 through the several chambers 38, 44, 46 and 42 thereby establishing a direction of flow of electric current perpendicular to the planes of the membranes and of the slabs of foam.

In order to avoid water turbulence within the treating chambers 44 and 46 the feed water is pumped into the chambers with only enough pressure to maintain the flow of the water at the rate at which the electrical limits of the resin will permit its demineralization. A high velocity of water flow is not desirable because of stirring action and agitation developed in the water as it confronts and flows around the various ligaments of the reticulated foam blocks 58 and 60. Such stirring or agitation has in the past reduced efficiency of prior existing electrodialysis apparatus.

Upon entering the chambers 44 and 46 the feed water (not shown) fills the channels 62 from which it moves in opposite directions into the cation foam 58 and the anion foam 60 through the open cells formed by the ligaments of the foam and in a direction substantially parallel to the direction of flow of the current between the cathode 12 and anode 14. The water then flows from the chambers 44 and 46 through the outlet ports 54 and 56.

As the feed water enters the compartments 44 and 46 it is subjected to the electric field which is maintained normal to the membranes 26, 28, 30, and 32.

Assuming the feed water contains the salt sodium chloride among other things, as the current passes through the water the cations or sodium ions flow in the direction of the electric field and the anions or chloride ions flow counter to the electric field. Thus, as the water flows from the channel 62 through the cation foam 58 as shown by the arrows 88 it encounters the cation membrane 26 or 30 which is water impermeable and then moves to the right towards the outlet ports 54. At the same time the sodium ions transfer to the resin phase as they encounter a declining chloride concentration in the solution. The situation is one of a sodium ion flux of decreasing magnitude in the solution and increasing magnitude in the resin flowing through a declining concentration of essentially stationary chloride ions. The sodium ions then flow through the cation membranes 26 and 30 into the purge chambers 28 and 40.

In similar manner other portions of the water entering the distribution channels 62 flow into the anion foam blocks 60 as shown by the arrows 92 until the water encounters the anion membranes 28 and 32 from where it flows to the right and out of the chambers 44 and 46 through the outlet ports 56. As the water flows in the direction of the arrows 90 the chloride ions enter the resin phase progressively in an electroneutral flux through the solution, neutrality being preserved by a declining population of stationary chloride ions. They finally pass the anion membranes 28 and 32 into purge chambers 40 and 42.

As a result of the dissociated efflux of the sodium and chloride ions from the treatment chambers the feed water is desalted so that the water flowing out of the outlet ports 54 and 56 is relatively pure and unmixed with the incoming feed water. In order to expedite the flow of the desalted or pure water at the surfaces of the membranes 26, 28, 30, and 32 each block of foam 58 and 60 may be provided with a series of spaced opening means or pores 92 and 94, respectively, which communicate with the outlet ports 54 and 56. As the ions of sodium and chlorine enter the purge chamber or compartment 40 they are carried out of the system by the purge water through ports 50. Those entering chambers 38 and 42 are carried out of the system by the purge water through the outlet ports 50.

As shown in FIG. 2 as feed water enters the chamber 86 part of it enters the open-celled foam block 64 where sodium ions are collected into the resin phase as shown by the arrows 95. At the inner face of the block 64 and the membrane 70 the desalted water flows towards the outlet port 76 and the sodium ion flows through the membrane 70. In a similar manner the other portion of the water from the chamber 86 flows in the direction of the arrows 98 into the anion foam block 66 where the chlorine anions are collected into the resin phase and move through the membrane 72 toward the anode 14. The desalted water in the foam block 66 leaves the chamber 68 through the outlet port 78. A series of spaced opening means or pores 77 and 79 may be provided in the blocks 64 and 66, respectively, to communicate with the ports 76 and 78, similar to the pores 92 and 94.

As a result of the foregoing process there is a declining concentration gradient of salt from the channel 62 in both directions towards the cation membrane and the anion membrane. The separation of the sodium chloride from the water in both foam blocks 58 and 60 results in the sodium ions moving across the inlet and through resin in block 58 towards the cathode 12, and the chloride ion moves across the inlet and through resin of block 60 towards the anode 14.

As a result of the foregoing process the desalted water is not mixed and thereby contaminated with incoming feed water of a higher salt concentration. As was indicated above the pressure applied to the feed water is sufficient to maintain a flow of desalted product without the agitation, stirring and turbulence of water necessary to stave off polarization in the orthodox cell.

Accordingly, the present invention satisfies a long existing problem in the art by providing an electrodialysis device in which the solvent being treated is caused to flow through a treating chamber in a non-agitated manner and without commingling with incoming untreated solvent. The resulting solvent product is a purified dialyzate which is uncontaminated with untreated solvent.

It is understood that the above specification and drawings are merely exemplary and not in limitation of the invention.

What is claimed is:

1. An electrodialysis apparatus for demineralizing water comprising a cathode, an anode, means forming at least one treating chamber and a purge chamber on opposite sides of the treating chamber, the chamber being disposed between the anode and cathode, a water impermeable cation membrane between the treating chamber and one purge chamber on the cathode side of the treating chamber, a water impermeable anion membrane between the treating chamber and the other purge chamber on the anode side of the treating chamber, each purge chamber having inlet and outlet means for purge water, each treating chamber having feed water inlet means at one end and water outlet means at the opposite end, the treating chamber being at least partially filled with an open-celled cation foam block on the side adjacent to the cation membrane and with an open-celled anion foam on the side adjacent to the anion membrane, the open-celled cation foam overlying a portion of the water outlet means and the open-celled anion foam overlying the remaining portion of the water outlet means, whereby feed water entering the treating chamber flows in a turbulent-free manner between the inlet and outlet means without remixing with subsequently incoming feed water.

2. The apparatus of claim 1 in which the open-celled cation foam is composed of sulfonated polystyrene resin, and in which the open-celled anion foam is composed of an amine resin.

3. The apparatus of claim 1 in which the cation foam and the anion foam form a feed water receiving channel substantially coextensive with the compartment, the channel being aligned with the feed water inlet means, and unaligned with the feed water outlet means.

4. The apparatus of claim 1 in which the anion and cation foam blocks are provided with aperture means substantially coextensive with the blocks and adjacent to the corresponding membranes and communicative with the water outlet means.

5. The apparatus of claim 3 in which the open-celled foam blocks form communication between the channel and the water outlet means.

References Cited

UNITED STATES PATENTS

| | | | |
|---|---|---|---|
| 2,815,320 | 12/1957 | Kollsman | 204—180 |
| 2,854,394 | 9/1958 | Kollsman | 204—180 |
| 3,014,855 | 12/1961 | Kressman | 204—180 |
| 3,084,113 | 4/1963 | Vallino | 204—131 |
| 3,149,061 | 9/1964 | Parsi | 204—180 |
| 3,251,764 | 5/1966 | Miller et al. | 204—301 |

JOHN H. MACK, Primary Examiner

A. C. PRESCOTT, Assistant Examiner

U.S. Cl. X.R.

204—180